United States Patent [19]

Kamiwada et al.

[11] Patent Number: 4,680,116

[45] Date of Patent: Jul. 14, 1987

[54] WATER PURIFIER APPARATUS

[75] Inventors: Minoru Kamiwada, Fukuoka; Kazuyuki Saruwatari, Ogoori; Kazuaki Shimada; Harumi Higashizima, both of Fukuoka, all of Japan

[73] Assignee: Matsushita Electric Industrial Co., Ltd., Osaka, Japan

[21] Appl. No.: 731,794

[22] Filed: May 8, 1985

[30] Foreign Application Priority Data

| May 8, 1984 | [JP] | Japan | 59-92251 |
| May 11, 1984 | [JP] | Japan | 59-95002 |
| May 11, 1984 | [JP] | Japan | 59-95041 |
| May 16, 1984 | [JP] | Japan | 59-97993 |

[51] Int. Cl.$^4$ .............................. B01D 27/10
[52] U.S. Cl. .............................. 210/282; 210/423
[58] Field of Search ............... 210/264, 282, 287, 422, 210/423

[56] References Cited

U.S. PATENT DOCUMENTS

| 621,766 | 3/1899 | Coffin | 210/422 |
| 4,147,631 | 4/1979 | Deines et al. | 210/137 |
| 4,172,796 | 10/1979 | Corder | 210/238 |

Primary Examiner—Ivars Cintins
Attorney, Agent, or Firm—Wenderoth, Lind & Ponack

[57] ABSTRACT

A water purifier apparatus for removing the bleaching agent, the smell of an adhesive used in joining water pipes, and other impurities from water supplied through a water supply system. The water purifier apparatus includes a body having a raw water outlet, a cartridge disposed in the body and housing a filter material, the cartridge having a raw water inlet and a purified water outlet with an enclosed water passage extending therebetween, the raw water outlet and the raw water inlet being coupled to each other in a watertight manner. The cartridge is subject to repeated stresses due to application of water pressure, which varies as the flow of water is turned on and off and since the cartridge that is replaced in a relatively short period of time, the cartridge may be of a relatively small mechanical strength. The cartridge is fixedly positioned in the body by a cover, which is prevented from becoming broken or damaged by varying stresses since these stresses are borne instead by the cartridge.

17 Claims, 10 Drawing Figures

WATER PURIFIER APPARATUS

BACKGROUND OF THE INVENTION

1. Field of the Invention

The present invention relates to water purifier apparatus adapted to be mounted on a faucet of a water supply system in a home or office for purifying water.

2. Description of the Prior Art

Water purifier apparatus are employed to remove the bleaching agent, the smell of an adhesive used in joining water pipes, and other impurities from water supplied through a water supply system.

In recent years there has been developed small-size water purifier apparatus which can be fastened directly to faucets of the water supply system.

The conventional small-size water purifier apparatus for direct mounting on a faucet includes a directional control valve for introducing supplied water into a cartridge housing a filter material, which removes the bleaching agent, the smell of an adhesive used in joining water pipes, and the turbidity due to impurities from the introduced water. However, the prior small-size water purifier apparatus has had the following problems:

The cartridge is first housed in the apparatus body, and then fixed in position by a cover case threaded over the apparatus body. Since the cover case is part of the water path in the apparatus body, the cover case is subjected to a water pressure when the water is passed through the water purifier apparatus. The cover case tends to somewhat expand under the applied water pressure, and return to the original shape when the water supply is stopped. Therefore, the cover case is repeatedly deformed or suffers from repetitive stresses as the water is passed and shut off. During a long period of use, the cover case is liable to be broken inasmuch as it deteriorates due to the repetitive stresses imposed thereon.

SUMMARY OF THE INVENTION

It is an object of the present invention to provide a water purifier apparatus which will overcome the problem with the conventional water purifier apparatus.

Another object of the present invention is to provide a water purifier apparatus having a cartridge which will be replaced in a relatively short period of time and which bears stresses caused due to the passage and shutoff of water.

Still another object of the present invention is to provide a water purifier apparatus having a seal member used to provide a watertight seal between the cartridge and the apparatus body, the seal member being shaped for easy replacement of the cartridge and prevented from being deformed to reduce the diameter of a water passage.

To achieve the above objects, there is provided a water purifier apparatus comprising a body having a raw water outlet and a purified water inlet, a cartridge disposed in the body and housing a filter material, the cartridge having a raw water inlet and a purified water outlet with a closed water passage extending therebetween, the raw water outlet and the raw water inlet being coupled to each other in a watertight manner, and the purified water outlet and the purified water inlet being also coupled to each other in a watertight manner.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS OF THE INVENTION

First embodiment

Figure 1:
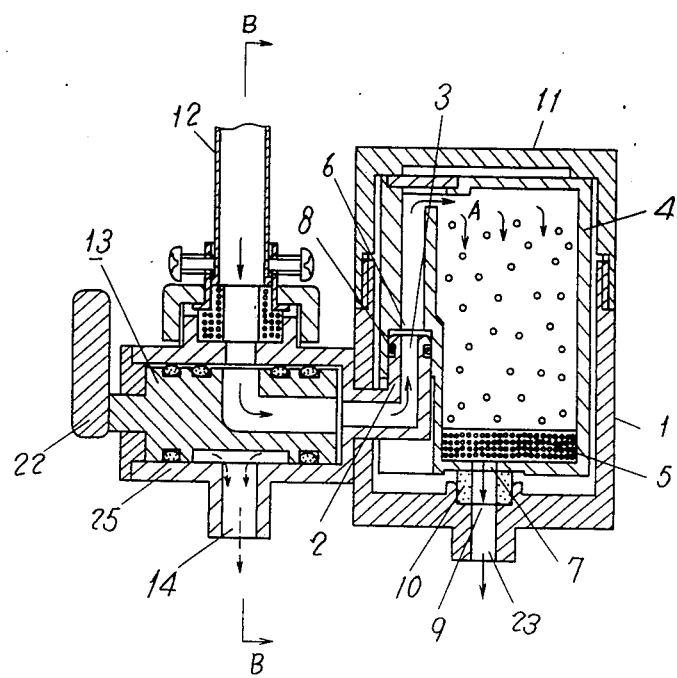
FIG. 1 is a vertical cross-sectional view of a water purifier apparatus according to an embodiment of the present invention.

As shown in FIG. 1, a water purifier apparatus according to a first embodiment of the present invention includes a hollow apparatus body 1 within which extends a tubular member 2 having a raw water outlet 3 on its distal end, which together form a raw water inlet conduit. A cartridge 4 housing filtering means, such as a filter material 5 therein, is accommodated in the apparatus body 1 and has a raw water inlet 6 and a purified water outlet 7, which are connected in a watertight manner by an enclosed water passage or passageway containing the filtering means as indicated by the arrows A. Seal means, such as an O-ring 8 is disposed around the tubular member 2 to provide an axial watertight seal between the tubular member 2 and the raw water inlet 6 of the cartridge 4. A watertight seal is also provided by seal means, such as a cylindrical seal member 10, between the purified water outlet 7 of the cartridge 4 and a purified water inlet 9 of the apparatus body 1. A purified water discharge outlet 23 of the apparatus body 1 is disposed downstream of the purified water inlet 9, and together they form a purified water outlet conduit. The cartridge 4 is fixedly positioned in the apparatus body 1 by a cover 11 threaded over the apparatus body 1. The apparatus body 1 includes a raw water inlet connected to a faucet 12 through a directional control valve means 13 for directing raw water from the faucet 12 to either the cartridge 4 or a raw water discharge outlet 14 in the apparatus body 1. The directional control valve 13 thereby selectively connects the raw water inlet of the apparatus body 1 to either the raw water outlet 3 in the apparatus body 1 or the raw water discharge outlet 14 in the apparatus body 1.

Figure 2:
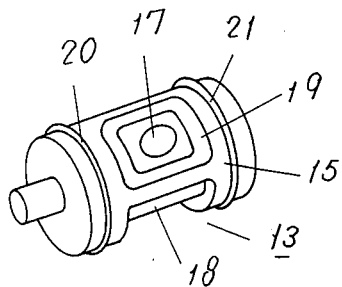
FIG. 2 is a perspective view of a valve body of a directional control valve for directing water to a cartridge or a raw water outlet.
Figure 3:
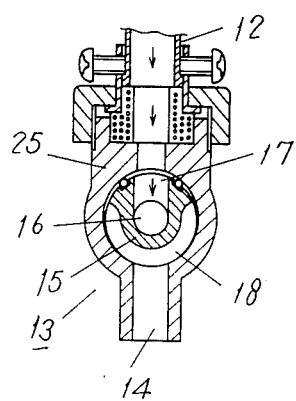
FIGS. 3 and 4 are cross-sectional views taken along line B—B of FIG. 1, showing the manner in which the directional control valve operates.

FIG. 2 shows the directional control valve 13 in greater detail. The directional control valve 13 includes a valve body 15 having a first water passage or passageway 16 (FIGS. 3 and 4) leading from a radial opening 17, defined centrally in the valve body 15, through a central axis portion thereof to an axial end thereof, the first water passage 16 being thus of an L shape. The valve body 15 also has a second water passage or passageway 18 defined through a 180° arc in an outer periphery thereof opposite to the radial opening 17. An annular seal ring 19 is disposed on the outer periphery of the valve body 15 around the radial opening 17, and circumferential seal rings 20, 21 are disposed around the valve body 15 at axially opposite ends thereof. A knob 22 is attached to an axial end of the valve body 15 opposite the end through which the L-shaped passage 16 extends. When the directional control valve 13 is positioned as shown in FIG. 1, water is guided from the faucet 12 through the first water passage 16 into the cartridge 4. The directional control valve 13 thus positioned is also shown in FIG. 3.

Figure 4:
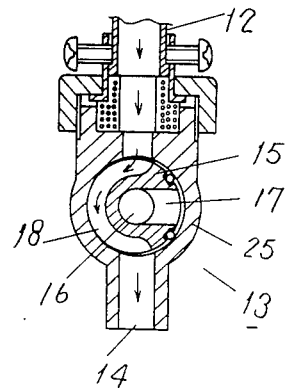

When the knob 21 is turned about 90° clockwise (FIG. 3), the valve body 15 is angularly moved to the position of FIG. 4 in which water now flows through the second water passage 18 to the raw water discharge outlet 14.

Operation of the water purifier apparatus thus constructed is as follows:

Water discharged from the raw water outlet 3 of the tubular member 2 through the raw water inlet 6 into the cartridge 4 is passed through the cartridge 4 in which unwanted smell, turbidity and other impurities are removed from water by the filter material 5. The purified water is then discharged from the water purifier through the purified water outlet 7 of the cartridge 4 and the purified water inlet 9 and purified water discharge outlet 23 of the apparatus body 1.

The pressure of the water after it flows in from the raw water inlet 6 and before it is discharged out of the purified water outlet 7 is borne by the cartridge 4, but not by the cover 11, which has been the case in conventional designs. Therefore, the cover 11 will not be damaged or broken even if the water purifier apparatus is in use for a long time.

Since the cartridge 4 is generally replaced in a relatively short period of time, normally once every six months, the cartridge 4 may be of a mechanical strength which should only be large enough to withstand applied water pressure for such an interval of time. Therefore, no particular problem is experienced with the mechanical strength of the cartridge 4 which bears the imposed water pressure.

Another advantage of the water purifier apparatus of the invention is as follows:

A relatively high water pressure is applied to a portion between the raw water outlet 3 of the apparatus body 1 and the raw water inlet 6 of the cartridge 4. Such a portion is sealed by an axial seal construction in which the tubular member 2 with the O-ring 8 disposed therearound is inserted in the cartridge 4. A seal is provided by the cylindrical seal member 10 between the purified water outlet 7 of the cartridge 4 and the purified water inlet 9 of the apparatus body 1, where the purified water having passed through the filter material 5 imposes little pressure, the cylindrical seal member 10 being held against the cartridge 4. Possible positional misalignment of the purified water outlet 7 with the purified water inlet 9 due to dimensional variations of the cartridge 4 can well be absorbed by selecting the inside diameter of the cylindrical seal member 10 to be larger than the diameter of the purified water outlet 7.

Second embodiment

Figure 5:
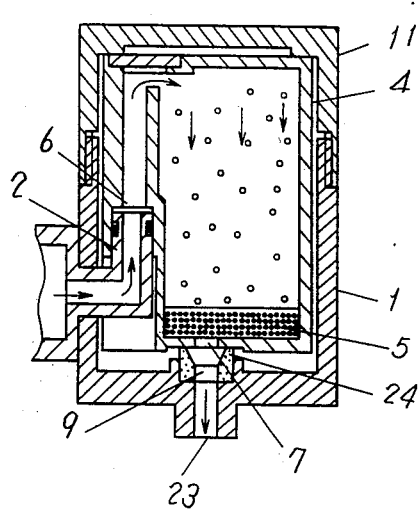
FIG. 5 is a vertical cross-sectional view of a water purifier apparatus according to another embodiment, having a modified seal member for providing a watertight seal between the purified water outlet of the cartridge and the purified water inlet of the apparatus body.
Figure 6:
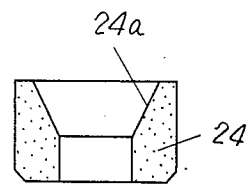
FIG. 6 is an enlarged vertical cross-sectional view of the seal member shown in FIG. 5.

FIGS. 5 and 6 show a modified seal member 24 according to a second embodiment of the present invention, the seal member 24 having an axial through hole including a tapered portion 24a with its diameter progressively greater in an upward direction towards the purified water outlet 7 of the cartridge 4.

Figure 7:
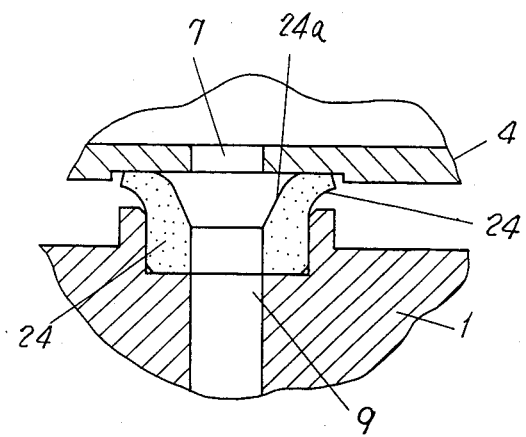
FIG. 7 is a fragmentary vertical cross-sectional view illustrating the sealing condition of the seal member shown FIG. 6.

When the cartridge 4 is mounted in the apparatus body 1 and the cover 11 is tightened over the cartridge 4, the seal member 24 is compressed by the cartridge 4, forcing the seal member 24 to spread radially outwardly at the upper end of the tapered portion 24a, as shown in FIG. 7. The illustrated construction of the seal member 24 is advantageous in that where the seal member 24 is to be axially compressed the same depth as the seal member 10 of the first embodiment, the compressive force required to press the seal member 24 may be smaller than that for compressing the seal member 11. Therefore, the cover 11 can be attached or detached with a smaller torque, and can more easily be opened and closed for replacement of the cartridge 4. Another advantage is that the seal member 24 is kept in good contact with the cartridge 4 even when the cartridge 4 is inserted obliquely and thus is disposed at an angle with respect to the apparatus body 1.

Figure 8:
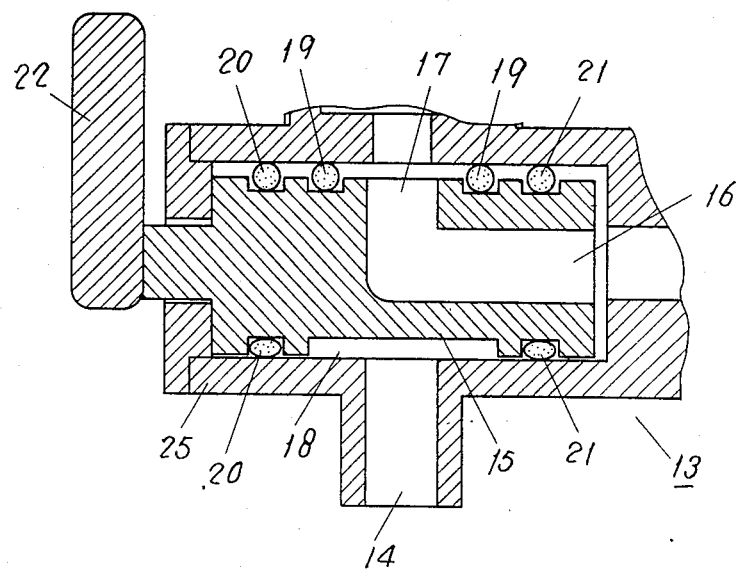
FIG. 8 is a vertical cross-sectional view of the directional control valve shown in FIG. 1.

The directional control valve 13 in the water purifier apparatus according to the first embodiment will be described in more detail with reference to FIG. 8. As shown in FIG. 8, the circumferential seal rings 20, 21 and the seal ring 19 are provided on the side of the outer circumferential surface of the valve body 15 through which the radial opening 17 opens, and only the circumferential seal rings 20, 21 are provided on the opposite side of the outer circumferential surface of the valve body 15. Therefore, the total resiliency of the seal rings 19, 20, 21 on the side of the radial opening 17 is larger than the resiliency of the circumferential seal rings 20, 21 on the opposite side, with the result that the portions of the seal rings 19, 20, 21 on the side of the radial opening 17 are compressed to a smaller degree than the portions of the circumferential seal rings 20, 21 on the opposite side. As a consequence, the valve body 15 is positioned off center, reducing the force with which the portions of the seal rings 19, 20, 21 on the side of the radial opening 17 are pressed between the valve body 15 and a casing 25 of the directional control valve 13, and also accelerating wear on the portions of the circumferential seal rings 20, 21 opposite to the radial opening 17. It would be possible to position the valve body 15 in axial alignment by substantially equating the outside diameter of the valve body 15 to the inside diameter of the casing 25. However, this solution would be problematic in that the valve body 15 would not smoothly be operated even when the valve body 15 and the casing 25 had a slight degree of out-of-roundness or were coated with incrustation.

Figure 9:
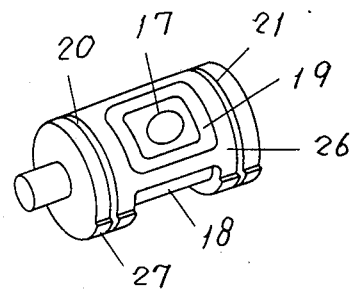
FIG. 9 is a perspective view of a modified valve body.
Figure 10:
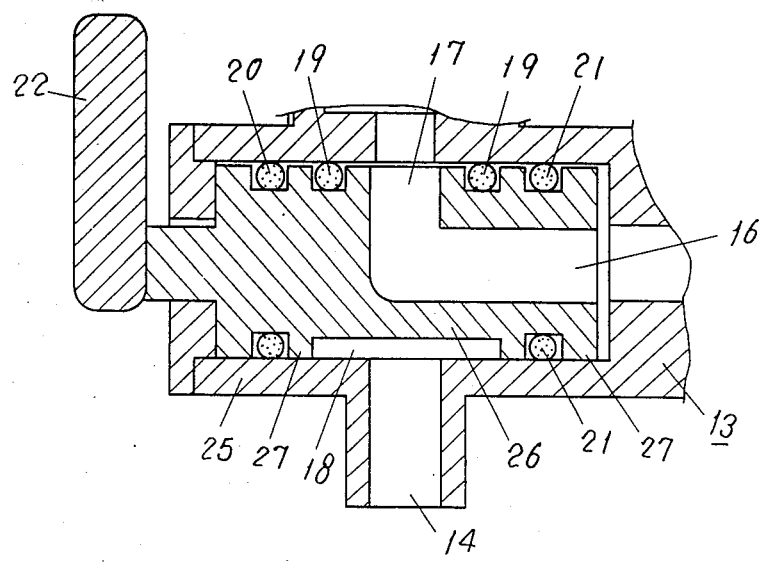
FIG. 10 is a vertical cross-sectional view of a directional control valve employing the valve body of FIG. 9.

The above drawback can be avoided by a valve body 26 of a modified shape as shown in FIGS. 9 and 10. The valve body 26 has an outer peripheral surface different from that of the valve body 15 illustrated in FIG. 2.

More specifically, the valve body 26 has ridges 27 on a semicircular peripheral surface thereof opposite to the radial opening 17 for limiting the compression of the circumferential seal rings 20, 21 which are disposed between the ridges 27.

When valve body 26 is subjected to a radial force due to the larger total resiliency of the portions of the seal rings 19, 20, 21 on the side of the radial opening 17, the portions of the circumferential seal rings 20, 21 on the opposite side are prevented by the ridges 27 from being excessively compressed, but are compressed to substantially the same degree as the portions of the circumferential seal rings 20 21 on the side of the radial opening 17. Therefore, the valve body 26 is prevented from being radially displaced off center and can be operated smoothly, and the circumferential seal rings 20, 21 are also protected from localized wear to guard against undesired water leakage therepast.

Although certain preferred embodiments have been shown and described, it should be understood that many changes and modificatins may be made therein without departing from the scope of the appended claims.

What is claimed is:

1. A water purifier apparatus comprising:
   (a) a body having a raw water outlet and a purified water outlet conduit;
   (b) a cartridge disposed in said body and housing a filter material, said cartridge having a raw water inlet and a purified water outlet with an enclosed water passage extending therebetween; and
   (c) said raw water outlet of said body and said raw water inlet of said cartridge being coupled to each other in a watertight manner and said purified water outlet of said cartridge being coupled to said purified water outlet of said body in a watertight manner.

2. A water purifier apparatus according to claim 1, wherein said body includes a purified water inlet and a purified water discharge outlet forming said purified water outlet conduit, said purified water outlet of said cartridge being coupled to said purified water inlet of said body in a watertight manner.

3. A water purifier apparatus according to claim 1, including a cover threaded over said body upwardly of said cartridge to fixedly position said cartridge in said body.

4. A water purifier apparatus according to claim 1, including a tubular member disposed in said body and having one end forming said raw water outlet, and an O-ring fitted around said tubular member, said tubular member being inserted in an opening in said cartridge with said raw water outlet being coupled to said raw water inlet of the cartridge in a watertight manner.

5. A water purifier apparatus comprising:
   (a) a body having a raw water outlet, a purified water inlet, and a purified water discharge outlet communicating with said purified water inlet;
   (b) a cartridge disposed in said body and housing a filter material, said cartridge having a raw water inlet and a purified water outlet with an enclosed water passage extending therebetween;
   (c) said raw water outlet of said body and said raw water inlet of said cartridge being coupled to each other in a watertight manner; and
   (d) a cylindrical seal member coupling said purified water outlet of said cartridge to said purified water inlet of said body in a watertight manner.

6. A water purifier apparatus according to claim 5, wherein said cylindrical seal member includes an axial through hole having an inside diameter which becomes progressively larger toward said purified water outlet of said body, said cylindrical seal member coupling said purified water outlet of said cartridge and said purified water inlet of said body to each other in a watertight manner.

7. A water purifier apparatus according to claim 5, including a cover threaded over said body upwardly of said cartridge to fixedly position said cartridge in said body.

8. A water purifier apparatus comprising:
   (a) a body having a purified water outlet conduit, a raw water outlet and a raw water discharge outlet and housing a directional control valve for selectively guiding water to said raw water outlet and said raw water discharge outlet;
   (b) a cartridge disposed in said body and housing a filter material, said cartridge having a raw water inlet and a purified water outlet with an enclosed water passage extending therebetween; and
   (c) said raw water outlet of said body and said raw water inlet of said cartridge being coupled to each other in a watertight manner and said purified water outlet of said cartridge being coupled to said purified water outlet conduit of said body in a watertight manner.

9. A water purifier apparatus according to claim 8, wherein said body has a purified water inlet and a purified water discharge outlet communicating therewith forming said purified water outlet conduit, said purified water outlet of said cartridge being coupled to said purified water inlet of said body in a watertight manner.

10. A water purifier apparatus according to claim 8, including a cover threaded over said body upwardly of said cartridge to fixedly position said cartridge in said body.

11. A water purifier apparatus, comprising:
    (a) a hollow body adapted for connection to a source of raw water, said hollow body including a raw water conduit, a raw water discharge outlet and a purified water outlet conduit;
    (b) means for selectively connecting the source of raw water to said raw water conduit or said raw water discharge outlet;
    (c) a cartridge removably disposed in said hollow body, said cartridge having a raw water inlet, a purified water outlet and an enclosed water passageway within said cartridge connecting said raw water inlet to said purified water outlet in a watertight manner, said cartridge including filtering means disposed in said enclosed water passageway for purifying raw water passed from said raw water inlet to said purified water outlet;
    (d) first seal means between said raw water conduit of said hollow body and said raw water inlet of said cartridge to provide a watertight connection therebetween; and
    (e) second seal means between said purified water outlet of said cartridge and said purified water outlet conduit of said hollow body to provide a watertight connection therebetween;
    whereby said removable cartridge bears the repetitive stresses which result from the repeated supply of water through said filtering means thereby avoiding damage to said hollow body from stresses imposed due to water pressure when the supply of water is repeatedly turned on and off.

12. The water purifier apparatus of claim 11, wherein said hollow body includes a removable cover enclosing said removable cartridge.

13. The water purifier apparatus of claim 12, wherein said raw water conduit comprises a tubular member extending within said hollow body and inserted in said removable cartridge and said first seal means comprises an O-ring disposed around said tubular member to provide a watertight seal between said tubular member and said raw water inlet of said removable cartridge.

14. The water purifier apparatus of claim 13, wherein said second seal means comprises a cylindrical seal member between said removable cartridge and said hollow body, said cylindrical seal member having an axial hole therethrough which is progressively greater in diameter in a direction towards said removable cartridge.

15. The water purifier apparatus of claim 14, wherein said means for selectively connecting the source of raw water to said raw water conduit or said raw water discharge outlet comprises a directional control valve disposed in said hollow body, said directional control valve including a valve body having a first L-shaped water passageway extending from a radial opening in a central axial portion thereof to an axial end thereof and a second water passageway in an outer periphery thereof opposite to said radial opening, said second passageway forming an arc which extends 180° around said valve body, said directional control valve further including an annular seal ring disposed around said radial opening on the outer periphery of said valve body and circumferential seal rings disposed around said valve body at axially opposite ends thereof, said valve body being rotatable in said hollow body to direct raw water through said first passageway to said raw water conduit or through said second passageway to said raw water discharge outlet.

16. The water purifier apparatus of claim 11, wherein said second seal means comprises a cylindrical seal member between said removable cartridge and said hollow body, said cylindrical seal member having an axial hole therethrough which is progressively greater in diameter in a direction towards said removable cartridge.

17. The water purifier apparatus of claim 11, wherein said means for selectively connecting the source of raw water to said raw water conduit or said raw water discharge outlet comprises a directional control valve disposed in said hollow body, said directional control valve including a valve body having a first L-shaped water passageway extending from a radial opening in a central axial portion thereof to an axial end thereof and a second water passageway in an outer periphery thereof opposite to said radial opening, said second passageway forming an arc which extends 180° around said valve body, said directional control valve further including an annular seal ring disposed around said radial opening on the outer periphery of said valve body and circumferential seal rings disposed around said valve body at axially opposite ends thereof, said valve body being rotatable in said hollow body to direct raw water through said first passageway to said raw water conduit or through said second passageway to said raw water discharge outlet.

* * * * *